United States Patent [19]

Schulz et al.

[11] 4,339,346

[45] Jul. 13, 1982

[54] BITUMINOUS EMULSIONS

[75] Inventors: Johann G. D. Schulz, Pittsburgh; John A. Cobler, Harwick, both of Pa.

[73] Assignee: Gulf Research & Development Company, Pittsburgh, Pa.

[21] Appl. No.: 110,797

[22] Filed: Jan. 9, 1980

[51] Int. Cl.$^3$ .................. B01J 13/00; C08L 95/00
[52] U.S. Cl. ............................... 252/311.5; 106/277; 252/314; 252/356
[58] Field of Search ..................... 252/311.5, 356; 562/410; 106/277

[56] References Cited

U.S. PATENT DOCUMENTS

| | | | |
|---|---|---|---|
| 2,003,860 | 6/1935 | McConnaughay | 252/311.5 |
| 2,684,949 | 7/1954 | McMillan et al. | 252/314 |
| 2,949,426 | 8/1960 | Thiegs | 252/307 |
| 4,052,448 | 10/1977 | Schulz et al. | 521/143 X |
| 4,235,728 | 11/1980 | Schulz et al. | 252/8.5 C |

FOREIGN PATENT DOCUMENTS 830521  3/1960  United Kingdom ............. 252/311.5

*Primary Examiner*—Richard D. Lovering
*Attorney, Agent, or Firm*—Deane E. Keith; Forrest D. Stine; Joseph J. Carducci

[57] ABSTRACT

A bituminous emulsion containing bituminous material, water and the product resulting from the reaction of (1) polycyclic, polycarboxylic acids obtained as a result of the oxidation of coal with (2) a base. The process for preparing such emulsion is also disclosed.

16 Claims, No Drawings

BITUMINOUS EMULSIONS

BACKGROUND OF THE INVENTION

1. Field of the Invention

This invention relates to a bituminous emulsion containing bituminous material, water and the product resulting from the reaction of (1) polycyclic, polycarboxylic acids obtained as a result of the oxidation of coal with (2) a base and to a process for preparing such emulsion.

2. Description of the Prior Art

Bituminous emulsions are well-known and are widely used, for example, in coating steel to protect it from brine systems, as driveway sealers, roof coatings, for paving roadways, etc. It is an object herein to provide an aqueous bituminous emulsion prepared using a relatively inexpensive emulsifier that is easily prepared and is stable in storage.

SUMMARY OF THE INVENTION

We have prepared stable aqueous bituminous emulsions using as an inexpensive and extremely effective emulsifier therefor the product resulting from the reaction of (1) polycyclic, polycarboxylic acids obtained as a result of the oxidation of coal with (2) a base.

In preparing the emulsion we require only three components: water, a bituminous material and the product resulting from the reaction of (1) polycyclic, polycarboxylic acids obtained as a result of the oxidation of coal with (2) a base.

The bituminous materials used herein can be derived from any source containing a bituminous material, for example, bitumen itself, asphalt, petroleum oil, still residues of paving grade, coal tar, plastic residues from coal tar distillation, petroleum pitch, petroleum resins, etc.

The polycyclic, polycarboxylic acids employed in the reaction with a base to obtain the product used to prepare the emulsion herein can be obtained by any conventional or suitable procedure for the oxidation of coal. Bituminous and subbituminous coals, lignitic materials and other types of coal products are exemplary of coals that are suitable herein. Some of these coals in their raw state will contain relatively large amounts of water. These can be dried prior to use, if desired, and preferably can be ground in a suitable attrition machine, such as a hammermill, to a size such that at least about 50 percent of the coal will pass through a 40-mesh (U.S. Series) sieve. The carbon and hydrogen content of the coal are believed to reside primarily in multi-ring aromatic and non-aromatic compounds (condensed and/or uncondensed), heterocyclic compounds, etc. On a moisture-free, ash-free basis the coal can have the following composition:

TABLE I

| | Weight Percent | |
| --- | --- | --- |
| | Broad Range | Preferred Range |
| Carbon | 45–95 | 60–85 |
| Hydrogen | 2.2–8 | 5–7 |
| Oxygen | 2–46 | 8–40 |
| Nitrogen | 0.7–3 | 1–2 |
| Sulfur | 0.1–10 | 0.2–5 |

Any conventional or suitable oxidation procedure can be used to convert the coal to the desired polycyclic, polycarboxylic acids. For example, a stirred aqueous slurry containing coal in particulate form, with or without a catalyst, such as cobalt, manganese, vanadium, or their compounds, can be subjected to a temperature of about 60° to about 225° C. and an oxygen pressure of about atmospheric (ambient) to about 2000 pounds per square inch gauge (about atmospheric to about 13.8 MPa) for about one to about 20 hours. The product so obtained can then be subjected to mechanical separation, for example filtration, and solid residue can be washed with water, if desired, and dried. The solid product remaining will be a mixture of water-insoluble polycyclic, polycarboxylic acids, hereinafter referred to as "water-insoluble coal carboxylate". A preferred procedure for preparing such coal carboxylate involves subjecting a slurry containing coal in particulate form to oxidation with nitric acid. An exemplary procedure for so converting coal to coal carboxylate is disclosed, for example, in U.S. Pat. No. 4,052,448 to Schulz et al. Thus, a slurry containing coal can be subjected to reaction with aqueous nitric acid having a concentration of about one to about 90 percent, preferably about three to about 70 percent, at a temperature of about 15° to about 200° C., preferably about 25° to about 100° C., and a pressure of about atmospheric to about 2000 pounds per square inch gauge (about atmospheric to about 13.8 MPa), preferably about atmospheric to about 500 pounds per square inch gauge (about atmospheric to about 3.5 MPa), for about five minutes to about 15 hours, preferably about two to about six hours. The oxidation with nitric acid, can, if desired, be carried out in an atmosphere containing molecular oxygen, as, for example, in U.S. patent application Ser. Nos. 923,953 and 924,054, filed July 12, 1978 of Schulz et al now U.S. Pat. Nos. 4,195,185 and 4,195,186, respectively, both issued on Mar. 25, 1980. The resulting product is then subjected to mechanical separation, for example filtration, and the solid residue can be washed with water, if desired, and dried to produce the water-insoluble coal carboxylate.

The entire mixture of water-insoluble coal carboxylate so obtained, or any portion thereof, can be used in the reaction with a base herein, if desired. An example of a portion of the entire mixture of water-insoluble coal carboxylate that can be used in the reaction with a base is the extract obtained as a result of the extraction of the entire mixture of water-insoluble coal carboxylate with a polar solvent as defined in U.S. Pat. No. 4,052,448 to Schulz et al. Another example of a portion of the water-insoluble coal carboxylate that can also be retracted with a base herein is that portion of the water-insoluble coal carboxylate that is insoluble in a polar solvent as defined in U.S. Pat. No. 4,147,882 to Schulz et al. Still another example of polycyclic, polycarboxylic acids that can be reacted with a base herein are the water-soluble polycyclic, polycarboxylic acids present in the filtrate obtained when coal is oxidized and the resulting product is subjected to filtration, as for example, the water-soluble, polar solvent-soluble carboxylic acids obtained in U.S. Pat. No. 4,137,418 to Schulz et al. These can be referred to as "water-soluble coal carboxylate". For simplicity, all of these acids can be referred to as "coal carboxylate".

The individual components of the coal carboxylate are believed to be composed of condensed and/or non-condensed aromatic and non-aromatic rings, with an average number of such rings in the individual molecules ranging from about one to about ten, but generally from about two to about eight. On the average it is believed the number of carboxyl groups carried by the individual molecules will range from about two to about eight, generally from about three to about eight. The average molecular weight can range from about 200 to about 3000, but generally can be from about 300 to about 3000 and the average neutral equivalent from about 50 to about 900, generally from about 70 to about 600. A typical analysis of the coal carboxylates on a moisture-free and ash-free basis that will be reacted with the base herein is set forth below in Table II.

TABLE II

|  | Weight Percent | |
| --- | --- | --- |
|  | Broad Range | Preferred Range |
| Carbon | 35 to 65 | 37 to 62 |
| Hydrogen | 1 to 5 | 3 to 5 |
| Nitrogen | 1 to 6 | 3 to 6 |
| Oxygen | 20 to 60 | 30 to 50 |
| Sulfur | 0.1 to 8 | 0.1 to 5 |

Any base, including the corresponding or basic salt, organic or inorganic, that can react with an acid can be used herein to react with the coal carboxylate. Thus, hydroxides of the elements of Group IA and Group IIA of the Periodic Table can be used. Of these we prefer to use potassium, sodium or calcium hydroxide. In addition ammonium hydroxide can also be used. Among the organic bases that can be used are aliphatic amines having from one to 12 carbon atoms, preferably from one to six carbon atoms, such as methylamine, ethylamine, ethanolamine and hexamethylenediamine, aromatic amines having from six to 60 carbon atoms, preferably from six to 30 carbon atoms, such as aniline and naphthylamine, aromatic structures carrying nitrogen as a ring constituent, such as pyridine and quinoline, etc. By "basic salt" we mean to include salts of the elements of Group IA and IIA of the Periodic Table whose aqueous solutions exhibit a pH in the basic region, such as potassium carbonate, sodium metasilicate, calcium acetate, barium formate, etc.

The reaction between the coal carboxylate and the base is easily effected. The amounts of reactants are so correlated that the amount of base used is at least that amount stoichiometrically required to react with all, or a portion (for example, at least about 10 percent, peferably at least about 50 percent), of the carboxyl groups present in the coal carboxylate. This can be done, for example, by dispersing the coal carboxylate in an aqueous medium, such as water, noting the initial pH thereof, adding base thereto while stirring and continuing such addition while noting the pH of the resulting mixture. Such addition can be stopped anytime. In the preferred embodiment wherein a large portion or substantially all of the carboxyl groups are desirably reacted with the base, addition of base is continued until a stable pH reading is obtained. The reactions can be varied over a wide range, for example, using a temperature of about 5° to about 150° C., preferably about 15° to about 90° C., and a pressure of about atmospheric to about 75 pounds per square inch gauge (about atmospheric to about 0.5 MPa), preferably about atmospheric (about 0.1 MPa). The resulting product can then be subjected, for example, to a temperature of about 20° to about 200° C. under vacuum to about 100 pounds per square inch gauge (under vacuum to about 0.69 MPa) for the removal of water therefrom. However, if desired the water need not be removed from the total reaction product and the total reaction product, or after removal of a portion of the water therefrom, can be used to prepare the emulsions as taught herein.

The amounts of each component present in the emulsion prepared herein can be varied over a wide range. Thus, the weight ratio of bituminous material to water can be in the range of about 19:1 to about 1:6, preferably in the range of about 4:1 to about 1:4. The amount of emulsifier used, that is, the product resulting from the reaction of coal carboxylate with a base, on a weight basis, relative to water, can be in the range of about 1:199 to about 1:3, preferably in the range of about 1:49 to about 1:4.

The emulsions defined and claimed herein are easily prepared. A convenient procedure involves introducing the emulsifier into water, while mixing, for a time sufficient to dissolve and/or disperse the emulsifier therein, for example, for a period of about 0.01 to about four hours. If desired, the emulsifier can be prepared in situ by separately introducing into the water the coal carboxylate and base and following the procedure hereinabove defined. To the mixture so prepared there is then added the bituminous material and mixing of the resulting mixture is continued, for example, from about 0.1 to about 10 hours, sufficient to obtain the desired emulsion. Mixing can be effected in any suitable manner, for example, using propeller agitation, turbine agitation, colloid mill, etc. The emulsions so prepared are stable, that is, there is no separation of water from the bituminous material and there is no agglomeration of bituminous material into larger size entities. When desired, however, the emulsions herein can easily be broken, for example, mechanically by bringing the same into contact with a body, for example, a road bed, or chemically, for example, by contact with an acid solution, such as hydrochloric acid.

DESCRIPTION OF PREFERRED EMBODIMENTS

A number of mixtures of polycyclic, polycarboxylic acids (coal carboxylate) was prepared as follows:

Coal Carboxylate A

To a one-gallon glass reactor equipped with a mechanical stirrer and heating and cooling coils there were charged 320 milliliters of water and 100 milliliters of 70 percent aqueous nitric acid. The mixture was heated to 80° C. and maintained at this temperature during the run. There was then concurrently added to the reactor over a period of 1.5 hours 388 milliliters of 13.9 percent aqueous nitric acid and 800 grams of powdered English Rank 900 coal. Over an additional period of 1.5 hours there was added an additional 410 milliliters of 13.9 percent aqueous nitric acid. During the entire reaction period, and in the subsequent preparations herein, the reaction mixture was maintained at autogeneous pressure. The reaction mixture was then maintained at 80° C. for one additional hour, cooled to room temperature and then removed from the reactor and filtered. The recovered solids were washed three times with water (1000 cubic centimeters of water each time), dried in a vacuum oven, resulting in the recovery of 718.1 grams of particulate polycyclic, polycarboxylic acids.

Coal Carboxylate B

In this run there were charged to the reactor 320 milliliters of water and 100 milliliters of 70 percent aqueous nitric acid. After the contents of the reactor were heated to 60° C. with stirring, there was added concurrently over a period of 1.3 hours 800 grams of powdered North Dakota lignite and 340 milliliters of 9.5 percent aqueous nitric acid. Over the next 1.7 hours there was added an additional 400 milliliters of 9.5 percent aqueous nitric acid. The reaction mixture was then held at 60° C. for four hours, cooled and worked up as in the preparation of Coal Carboxylate A. There was recovered 559.2 grams of polycyclic, polycarboxylic acids.

Coal Carboxylate C

In this run 240 milliliters of water and 25 milliliters of 70 percent aqueous nitric acid were charged to the reactor and heated to 60° C. with stirring. Over a period of 1.1 hours there was added concurrently to the reactor 400 grams of German Brown Coal and 265 milliliters of 6.6 percent aqueous nitric acid. This mixture was held at 60° C. for one hour, cooled and worked up as in the preparation of Coal Carboxylate A. There was obtained 326.3 grams of polycyclic, polycarboxylic acids.

Coal Carboxylate D

To the reactor there was charged 320 milliliters of water and 100 milliliters of 70 percent aqueous nitric acid. After the reactor contents were heated to 80° C. with stirring, there was added concurrently thereto over a period of 1.2 hours 800 grams of North Dakota Lignite and 290 milliliters of 70 percent aqueous nitric acid. Over the next 0.8 hour there was added to the reactor 210 milliliters of 70 percent aqueous nitric acid. The contents of the reactor were maintained at 80° C. for three and one-half hours, cooled to room temperature and then removed from the reactor and filtered. The aqueous filtrate was subjected to flash evaporation at a bath temperature of 100° C. and a pressure of 176 millimeters of mercury, resulting in the removal of water and nitric acid therefrom. The remaining product was dried in a vacuum and extracted with 1.5 liters of acetone. The extract was dried to remove acetone therefrom, resulting in the production of 63.8 grams of particulate water-soluble polycyclic, polycarboxylic acids.

Coal Carboxylate E

In this run there was charged to the reactor 320 milliliters of water and 100 milliliters of 70 percent aqueous nitric acid, after which the reactor contents were heated to 80° C. with stirring. To the reactor there was then concurrently added over a period of 1.7 hours 800 grams of North Dakota lignite and 495 milliliters of 9.5 percent aqueous nitric acid. Over the next 0.8 hour there was added to the reactor 245 milliliters of 9.5 aqueous nitric acid. The mixture was maintained at 80° C. for one hour, cooled to room temperature and then removed from the reactor and filtered. The recovered solids were washed three times with water (1000 milliliters each time) and dried in a vacuum oven, resulting in the recovery of 557.5 grams of total product. 100 grams of this product was extracted with 1.5 liters of acetone, resulting in the production of 78.6 grams of acetone-insoluble particulate polycyclic, polycarboxylic acids.

Coal Carboxylate F

In this run there were charged to the reactor 978 milliliters of water and 178.6 milliliters of 70 percent aqueous nitric acid. The mixture was heated to 60° C., with stirring and maintained at this temperature during the run. To the resulting mixture there was added a slurry comprised of 800 grams of North Dakota lignite and 800 milliliters of water over a one hour period. The mixture was held at 60° C. for three hours, cooled to room temperature and worked up as in the preparation of Coal Carboxylate A, resulting in the production of 560 grams of polycyclic, polycarboxylic acids.

The North Dakota lignite used above analyzed as follows: 33.0 weight percent water, 45.7 weight percent carbon, 2.8 weight percent hydrogen, 11.3 weight percent oxygen, 0.6 weight percent sulfur, 0.6 weight percent nitrogen and 6.0 weight percent metals. English Rank 900 Coal analyzed as follows: 13.6 weight percent water, 63.6 weight percent carbon, 4.3 weight percent hydrogen, 12.9 weight percent oxygen, 1.2 weight percent sulfur, 1.3 weight percent nitrogen and 3.1 weight percent metals. The German Brown Coal used analyzed as follows: 19.5 weight percent water, 53.8 weight percent carbon, 3.6 weight percent hydrogen, 19.7 weight percent oxygen, 0.2 weight percent sulfur, 0.8 weight percent nitrogen and 2.5 weight percent metals.

A number of emulsions was prepared as follows. Into a Waring Blender there were placed water, coal carboxylate and pellets of either sodium hydroxide or potassium hydroxide or ammonium hydroxide. There materials were mixed at low speeds (about 500 RPM) for about five minutes, sufficient to obtain a reaction product between the coal carboxylate and the base. To the resulting solution there was added bitumen and the resulting mixture was mixed at high speed (about 20,000 RPM) for about 20 minutes, sufficient to obtain an emulsion. The emulsions so prepared were examined at various intervals of time for stability by noting whether or not a separation of bitumen and water had occurred. Two control runs were also made wherein no coal carboxylate was used. In preparing the emulsions three bitumens, sold by Koppers Company, Inc., Pittsburgh, Pa., were used: Refined Tar KC 261, Refined Tar K 1139 and Refined Tar K 364. A coal tar pitch binder sold by Great Lakes Carbon Co., Niagara Falls, N.Y., believed to have the following specification, was used:

| | |
|---|---|
| Specific Gravity, 60/60° F., (15.6/15.6° C.) D 70 | 1.2439 |
| Viscosity, Kinematic: cSt | |
| 250° F. (122° C.) | BSOM |
| 350° F. (177° C.) | BSOM |
| Sulfur, Wt. Percent | 0.82 |
| Benzene Insolubles, D 2317: Wt. Percent | 29.76 |
| Quinoline Insolubles, D 2318: Wt. Percent | 14.1 |
| Ash, D 482: Wt. Percent | 0.46 |
| Coking Value, D 2416: Wt. Percent | 61.0 |
| Carbon, Semi Micro: Wt. Percent | 91.72 |
| Hydrogen, Semi Micro: Wt. Percent | 4.26 |
| Ash, Elements in Liquid HC: PPM | |
| Nickel | 3.5 |
| Vanadium | <1.0 |
| Sat.-Arom.: Wt. Percent | |
| Saturates | 0.5 |
| Aromatics | 12.7 |
| Polar Compounds | 3.4 |
| Insolubles | 83.4 |
| Aromatic Ring Types, Wt. Percent | |

-continued

| | |
|---|---|
| Monoaromatics | 0.16 |
| Diaromatics | 3.57 |
| Triaromatics | 2.76 |
| Polynuclear aromatics | 6.21 |
| Total Aromatics | 12.70 |
| Softening Point, CIA D 2319: °F. (°C.) | 233 (112) |

In addition a vacuum tower bottoms from an Agha Jari crude oil having the following specifications was also used.

| | |
|---|---|
| Specific Gravity, 60/60° F. (Theoretical) (15.6/15.6° C.) D 70 | 1.0007 |
| Viscosity, SUS,D 2161, 210° F. (99° C.) | 1364 |
| Viscosity, SUS,D 2161 250° F. (122° C.) | 501 |
| Pour Point, D 97, °F. (°C.) | +85 (+29.4) |
| Carbon and Hydrogen, Semi-Micro | |
| Carbon, Wt. Percent | 85.22 |
| Hydrogen, Wt. Percent | 10.72 |
| Nitrogen, Wt. Percent | 0.49 |
| Sulfur, Wt. Percent | 3.45 |
| Carbon Residue, D524, Wt. Percent | 14.2 |
| Aniline Point, D 611, °F. (°C.) | 180 (82.2) |
| Nickel, PPM | 50 |
| Vanadium, PPM | 160 |
| Heat of Combustion, D2382, Btu/Lb. | 18,261 |

The data obtained are tabulated below in Table III.

TABLE III

| Example No. | Bituminous Material | Grams of Bituminous Material | Water, Grams | Coal Carboxylate | Grams of Coal Carboxylate | Base | Grams of Base | Stability, Days[1] |
|---|---|---|---|---|---|---|---|---|
| I | K-261 | 100 | 100 | None | None | KOH | 5.6 | Unstable[2] |
| II | K-261 | 100 | 100 | None | None | KOH | 11.2 | Unstable |
| III | Coal Tar Pitch Binder | 90 | 100 | C | 10 | KOH | 5.6 | 23 |
| IV | K-261 | 100 | 100 | D | 20 | KOH | 5.6 | 30 |
| V | K-261 | 100 | 100 | E | 20 | KOH | 6.2 | 30 |
| VI | K-261 | 100 | 100 | B | 20 | KOH | 11.2 | 30 |
| VII | K-261 | 200 | 50 | B | 10 | KOH | 5.6 | 30 |
| VIII | K-261 | 40 | 160 | B | 36 | KOH | 5.6 | 30 |
| IX | K-261 | 100 | 100 | A | 20 | KOH | 11.2 | 30 |
| X | K-261 | 200 | 50 | F | 10 | KOH | 5.6 | 30 |
| XI | K-261 | 200 | 50 | F | 10 | NaOH | 5.6 | 30 |
| XII | K-261 | 200 | 50 | F | 5 | NaOH | 3.0 | 30 |
| XIII | K-261 | 200 | 50 | F | 2.5 | NaOH | 1.5 | 30 |
| XIV | K-261 | 200 | 50 | F | 1.3 | NaOH | 0.5 | 30 |
| XV | K-1139 | 100 | 100 | B | 20 | KOH | 11.2 | 30 |
| XVI | K-364 | 100 | 100 | B | 20 | KOH | 11.2 | 30 |
| XVII | K-364 | 200 | 21 | F | 10 | NH4OH | 29 | 30 |
| XVIII | Aghi Jari VTB | 105 | 100 | E | 20 | KOH | 11.2 | 30 |

[1]Last day of observation; no separation of water from emulsion noted.
[2]Water separated from emulsion at end of two hours.
[3]Water separated from emulsion at end of one hour.

The data in Table III above clearly exemplifies the stability of the emulsions claimed herein. In each of Examples I and II wherein emulsions were prepared wherein no coal carboxylate was present, the emulsions were so unstable that separation of water therefrom, thereby forming two separate and distinct phases occurred within one to two hours. In the remaining examples, however, wherein the emulsions were prepared using selected amounts of the product resulting from the reaction of a coal carboxylate and a base extremely stable emulsions were obtained.

Obviously, many modifications and variations of the invention, as hereinabove set forth, can be made without departing from the spirit and scope thereof and therefore only such limitations should be imposed as are indicated in the appended claims.

We claim:

1. A bituminous emulsion consisting essentially of bituminous material, water and the product resulting from the reaction of (1) polycylcic, polycarboxylic acids obtained as a result of the oxidation of coal with (2) a base, wherein the weight ratio of bituminous material to water is in the range of about 19:1 to about 1:6 and the weight ratio of said product to water is in the range of about 1:199 to about 1:3.

2. The emulsion of claim 1 wherein said product is water soluble.

3. The emulsion of claim 1 wherein said product is water insoluble.

4. The emulsion of claim 1 wherein said bituminous material is a tar.

5. The emulsion of claim 1 wherein said bituminous material is a coal tar pitch binder.

6. The emulsion of claim 1 wherein said bituminous material is a bitumen.

7. The emulsion of claim 1 wherein the weight ratio of bituminous material to water is in the range of about 4:1 to about 1:4 and the weight ratio of said product to water is in the range of about 1:49 to about 1:4.

8. The emulsion of claim 1 wherein said polycyclic, polycarboxylic acids are obtained as a result of the nitric acid oxidation of coal, said oxidation comprising subjecting a slurry containing coal to reaction with nitric acid having a concentration of about one to about 90 percent at a temperature of about 15° to about 200° C. for about five minutes to about 15 hours.

9. The emulsion of claim 1 wherein said polycyclic, polycarboxylic acids are obtained as a result of the nitric acid oxidation of coal, said oxidation comprising subjecting a slurry containing coal to reaction with nitric acid having a concentration of about three to about 70 percent at a temperature of about 50° to about 100° C. for about two to about six hours.

10. The emulsion of claim 1 wherein said base is an organic base.

11. The emulsion of claim 1 wherein said base is a hydroxide of an element of Group IA of the Periodic Table.

12. The emulsion of claim 1 wherein said base is a hydroxide of an element of Group IIA of the Periodic Table.

13. The emulsion of claim 1 wherein said base is sodium hydroxide.

14. The emulsion of claim 1 wherein said base is potassium hydroxide.

15. The emulsion of claim 1 wherein said base is calcium hydroxide.

16. The emulsion of claim 1 wherein said reaction with said base is carried out at a temperature of about 5° to about 150° C.

* * * * *